United States Patent
Elsäßer

(10) Patent No.: US 8,612,118 B2
(45) Date of Patent: Dec. 17, 2013

(54) PISTON ENGINE AND OPERATING METHOD

(75) Inventor: Alfred Elsäßer, Keltern (DE)

(73) Assignee: Mahle International GmbH (DE)

( * ) Notice: Subject to any disclaimer, the term of this patent is extended or adjusted under 35 U.S.C. 154(b) by 451 days.

(21) Appl. No.: 12/823,627

(22) Filed: Jun. 25, 2010

(65) Prior Publication Data

US 2011/0000459 A1   Jan. 6, 2011

(30) Foreign Application Priority Data

Jun. 27, 2009  (DE) .......................... 10 2009 030 771

(51) Int. Cl.
 *G06F 19/00* (2011.01)
 *F02D 17/02* (2006.01)
 *F02D 41/14* (2006.01)
 *F02M 51/00* (2006.01)

(52) U.S. Cl.
 USPC ........ 701/103; 123/198 F; 123/480; 701/104; 701/109

(58) Field of Classification Search
 USPC ......... 701/103, 104, 108–110, 112–114, 106, 701/111; 123/434, 436, 672, 674, 681, 692, 123/198 F, 478, 480
 See application file for complete search history.

(56) References Cited

U.S. PATENT DOCUMENTS

| | | | | |
|---|---|---|---|---|
| 4,256,074 A | * | 3/1981 | Sugasawa et al. | 60/276 |
| 4,274,373 A | * | 6/1981 | Sugasawa et al. | 60/276 |
| 4,459,960 A | * | 7/1984 | Ueno et al. | 123/481 |
| 4,483,288 A | * | 11/1984 | Ueno et al. | 123/198 F |
| 5,562,086 A | | 10/1996 | Asada et al. | |
| 5,988,144 A | * | 11/1999 | Yoshioka et al. | 123/493 |
| 7,324,889 B2 | * | 1/2008 | Arai et al. | 701/103 |
| 7,516,730 B2 | * | 4/2009 | Ukai et al. | 123/198 F |
| 7,836,866 B2 | * | 11/2010 | Luken et al. | 123/481 |
| 2004/0011322 A1 | | 1/2004 | Gerhardt | |
| 2006/0107919 A1 | * | 5/2006 | Nishi et al. | 123/198 F |

(Continued)

FOREIGN PATENT DOCUMENTS

| | | |
|---|---|---|
| DE | 19532159 A1 | 3/1996 |
| DE | 10047003 A1 | 4/2002 |

(Continued)

OTHER PUBLICATIONS

European Search Report for EP10166276.5 dated Oct. 31, 2013.
English abstract for JP04330331.
English abstract for DE-102005004731.

*Primary Examiner* — Willis R Wolfe, Jr.
*Assistant Examiner* — Johnny Hoang
(74) *Attorney, Agent, or Firm* — Rader, Fishman & Grauer PLLC

(57) ABSTRACT

A method for operating an engine, including, adjusting a target load, which lies below a full load; operating at least one cylinder in a first cylinder group with a first load, which is reduced with respect to the target load; operating at least one cylinder in a second cylinder group with a second load, which is increased with respect to the target load; selecting the first and second loads such that a resulting load is the target load; and selecting the first and second loads such that at least one environmental parameter value is improved, wherein the environmental parameters include at least one of a fuel consumption, a nitrogen oxide content in the exhaust gas, and a particle content in the exhaust gas.

21 Claims, 5 Drawing Sheets

(56) References Cited

U.S. PATENT DOCUMENTS

| | | | |
|---|---|---|---|
| 2006/0130814 A1* | 6/2006 | Bolander et al. | 123/481 |
| 2007/0234985 A1 | 10/2007 | Kolmanovsky | |
| 2007/0251234 A1 | 11/2007 | Liu et al. | |
| 2008/0135021 A1 | 6/2008 | Michelini et al. | |
| 2008/0146412 A1* | 6/2008 | Sagawa et al. | 477/108 |

FOREIGN PATENT DOCUMENTS

| | | |
|---|---|---|
| DE | 102005004731 A1 | 8/2006 |
| DE | 102006037934 A1 | 2/2008 |
| JP | 04330331 B2 | 9/2009 |
| WO | WO-2007/036386 A1 | 4/2007 |

* cited by examiner

PISTON ENGINE AND OPERATING METHOD

CROSS-REFERENCES TO RELATED APPLICATION

This application claims priority to German patent application DE 10 2009 030 771.0 filed on Jun. 27, 2009, which is hereby incorporated by reference in its entirety.

TECHNICAL FIELD

The present invention relates to a multi-cylinder piston engine, in particular of a motor vehicle, and an associated operating method.

BACKGROUND

To save fuel outside of a full load range of a multi-cylinder piston engine, it is known to implement a cylinder deactivation for at least one cylinder of the piston engine. In the case of a cylinder deactivation, the respective cylinder continues to run passively. Its combustion chamber is not fired. That is, no fuel is fed into the deactivated cylinder. To be able to provide a certain target load at the same rotational speed when the cylinder deactivation is activated, the remaining and still active cylinders have to provide a correspondingly higher load.

Such a cylinder deactivation can result in an asymmetrical load on the crankshaft of the piston engine.

SUMMARY

The present invention is concerned with the problem to provide, for a piston engine or for an associated operating method, an improved or at least a different embodiment which is in particular characterized by an improved piston engine behavior which is improved from an ecological and/or economical point of view.

This problem is solved according to the invention by the subject matters of the independent claims. Advantageous embodiments are subject matter of the dependent claims.

The invention is based on the general idea to divide the cylinders of the piston engine in at least two cylinder groups, each of them comprising at least one cylinder. For the case that a target load is to be adjusted which is below a full load of the piston engine, an asymmetrical load distribution among the at least two cylinder groups takes place. The cylinders of the first cylinder group are operated with a load which is reduced compared to the target load while, at the same time, the cylinders of the second cylinder group are operated with a load which is increased compared to the target load. The different loads of the two cylinder groups are selected in such a manner that the resulting load corresponds to the desired load. Furthermore, the adjustment of the load differing from the target load is specifically carried out in such a manner that for the entire piston engine, thus for all cylinders together, for at least one environmental parameter of the piston engine, an improved value is obtained in comparison to an operation in which all cylinders are operated symmetrically with the same target load. Considered as environmental parameters are, for example, the fuel consumption of the piston engine, the nitrogen oxide content in the exhaust gas of the piston engine, and the particle content in the exhaust gas of the piston engine.

The invention utilizes the knowledge that specifically in the partial-load range, many operating points exist in which a more or less good compromise between at least two environmental parameters is implemented, but that at low loads as well as higher loads there are operating points which show better environmental parameters or deliver at least a better average for the environmental parameters when in total the desired target load is to be provided again. It is important here that those cylinders of the first cylinder group which are operated with a reduced load compared to the target load, continue to contribute to the total load, thus to the target load and thus are not deactivated. Hereby, for a multitude of operating points, a more uniform load for the crankshaft can be implemented in comparison to an operation with cylinder deactivation.

According to an advantageous embodiment it can be provided in the case of a change of the target load which has a change rate which is below a specified limit value, that first only the cylinders of the second cylinder group are actuated for adjusting the second load. During such a transient state or unsteady operation of the piston engine, relatively small and/or slow load changes are thus carried out only with the cylinders of the second cylinder group to which a higher load is applied anyway. Hereby, on the one hand, the desired load change can be implemented faster. On the other hand, maintaining the cylinders of the first cylinder group at their reduced load results in a reduced increase of the environmental parameter or parameters in case of a positive load change and in a greater improvement of the environmental parameter or parameters in case of a negative load change.

As soon as in case of a load change, a stationary target load is reached again, the first load, thus the load of the cylinders of the first cylinder group, can be updated correspondingly, wherein at the same time the second load, thus the load of the cylinders of the second cylinder group, is adapted correspondingly.

Changing or adjusting the at least one environmental parameter can be carried out according to a particularly advantageous embodiment by means of additional valves which are arranged in a fresh air system supplying fresh air to the cylinders upstream of the inlet valves which control the gas exchange. For this, the piston engine is equipped with a first fresh air tract for fresh air supply to the cylinders of the first cylinder group and with a second fresh air tract for fresh air supply to the cylinders of the second cylinder group. In this case, a first additional valve is arranged in the first fresh air tract for opening and blocking the first fresh air tract or a cross-section of the first fresh air tract through which a flow can pass, while a second additional valve is arranged in the second fresh air tract to be able to open or block the same or its cross-section through which a flow can pass. By means of such additional valves, which are not intake throttle valves, flow dynamic effects can be utilized in the fresh air supply. For example, gas-exchange processes generate pressure fluctuations or pressure vibrations in the fresh air system which can be specifically intensified or changed or influenced by means of the additional valves.

Particularly advantageous for this is a development in which the respective additional valve opens and blocks in an activated state the respective cross-section with a frequency which is proportional to the speed of the crankshaft of the piston engine. For example, the respective additional valve can have a rotating flap gate. For changing the at least one environmental parameter, the phase position of the respective additional valve can be changed with respect to a rotational position of the crankshaft. By changing the phase position, the influence of the pressure vibrations in the fresh air can be specifically modulated.

Of particular advantage is a configuration in which the additional valves in each respective fresh air tract are arranged upstream of an intake point through which an exhaust gas recirculation system recycles exhaust gas from an exhaust gas system of the piston engine to the fresh air system, wherein an adjustment or control of the exhaust gas recirculation rate can be implemented by a specific actuation of the additional valves, in particular by their phase position relative to the crankshaft. It is principally possible to specifically intensify pressure vibrations in the fresh gas tracts by means of the additional valves. Here, negative pressure amplitudes generate a pressure gradient between an extraction point on the exhaust gas side of the exhaust gas recirculation system and the intake point on the fresh air side. By varying said negative pressure amplitudes, an exhaust gas recirculation rate can be specifically adjusted. Studies of the applicant have shown that changing the phase position of the respective additional valve, in addition to the exhaust gas recirculation rate, has also a significant influence on at least the mentioned environmental parameters. The invention thus proposes to use the additional valves with respect to their phase position not for adjusting of desired exhaust gas recirculation rates, but for adjusting optimal values for at least one environmental parameter or for adjusting optimized compromises for at least two environmental parameters. The respective exhaust gas recirculation rate then arises automatically through the phase position of the respective additional valve, which phase position is selected with respect to the at least one environmental parameter.

Thus, to optimize the cylinders of the two cylinder groups for the different loads with respect to the respective environmental parameter, the additional valves, which are allocated to the different fresh air tracts and thus to the different cylinder groups, can be operated with different phase positions relative to the crankshaft. It is particularly advantageous that said additional valves can be actuated very fast for changing their phase positions. In particular, the adjustment of a new phase position can be implemented within one complete rotation of the crankshaft. In this manner, also the load adaptations within the cylinder groups can be implemented in an extremely fast manner.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the scope of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the figures.

DETAILED DESCRIPTION

Figure 1:
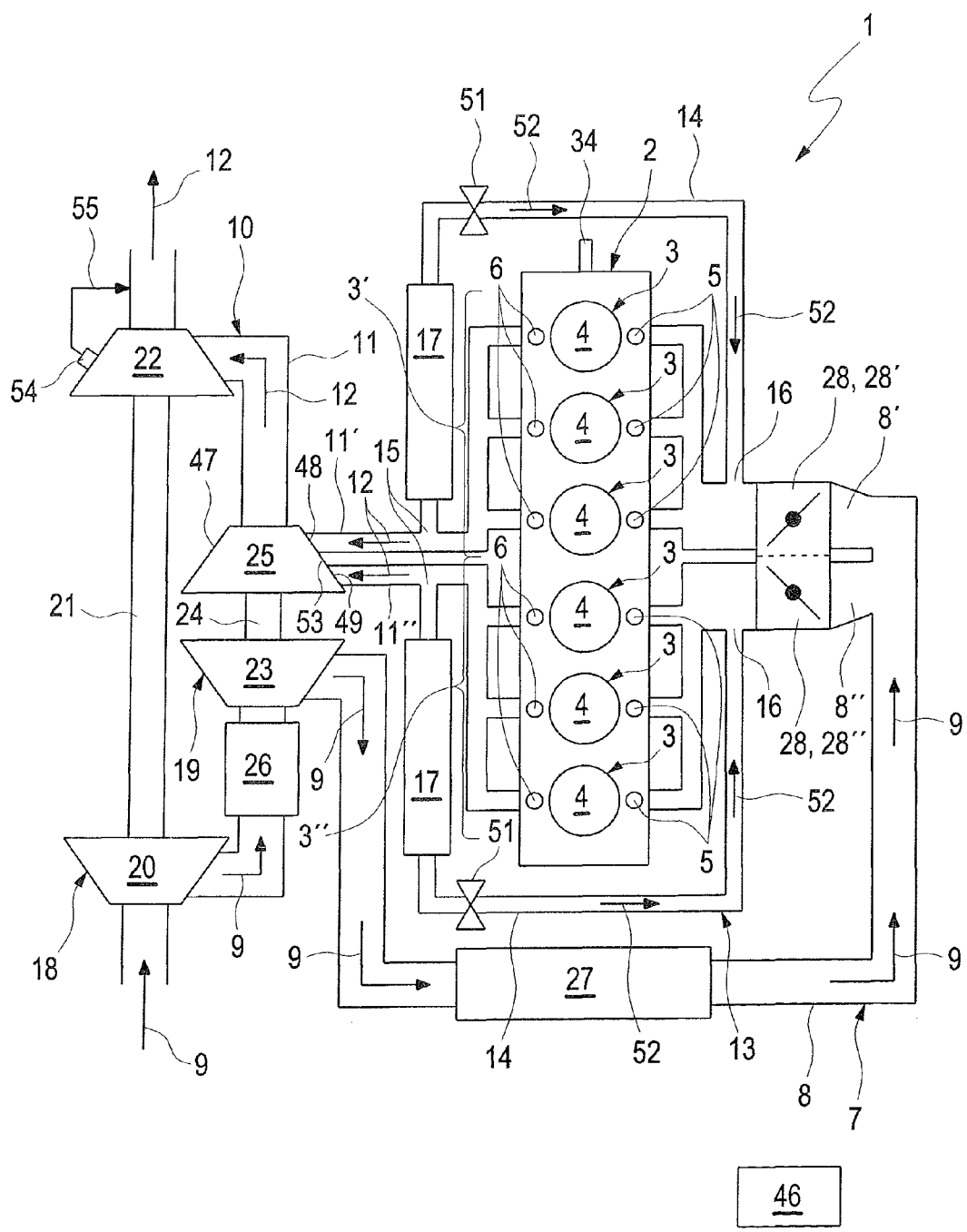
FIG. 1 shows schematically a greatly simplified circuit diagram-like basic illustration of a piston engine.

According to FIG. 1, a piston engine 1 as it can be used in motor vehicles, comprises, e.g., an engine block 2 including a plurality of cylinders 3, each of them enclosing a combustion chamber 4, and in which a piston is arranged in a stroke-adjustable manner, which piston is not specified in more detail. In the example, purely exemplary and without loss of generality, exactly six such cylinders 3 are arranged in series. To each combustion chamber 4, gas exchange valves, namely intake valves 5 and exhaust valves 6 are allocated, which are arranged within the engine block 2. In the example, for each combustion chamber 4, one intake valve 5 and one exhaust valve 6 is provided. It is obvious that two or more intake valves 5 or two or more exhaust valves 6 can be provided. The piston engine 1 serves preferably for the use as vehicle drive for commercial vehicles and passenger cars.

Figure 6:
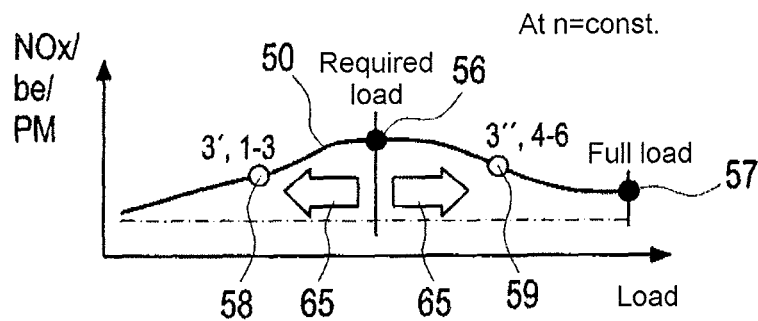
FIG. 6 shows schematically a simplified diagram for illustrating a dependency of environmental parameters on a load of the piston engine.
Figure 7:
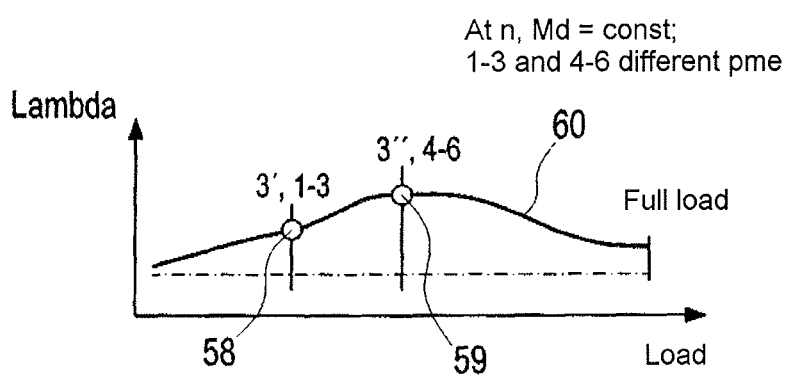
FIG. 7 shows schematically a simplified diagram for illustrating a dependency of an air ratio on the load of the piston engine.
Figure 8:
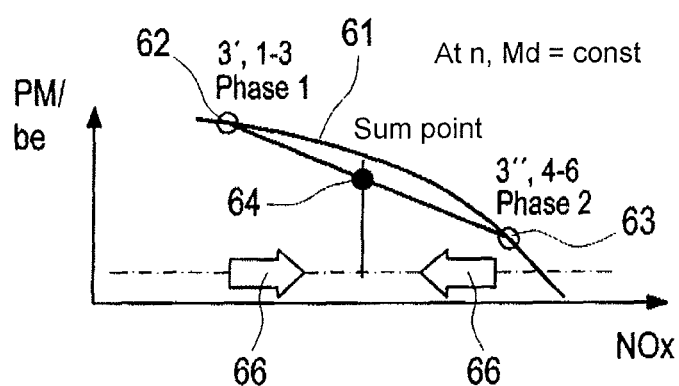
FIG. 8 shows schematically a greatly simplified diagram for illustrating a relation between a plurality of environmental parameters in a stationary operating point of the piston engine.

In the piston engine 1, two cylinder groups are formed, namely a first cylinder group 3' and a second cylinder group 3" which are marked in FIG. 1 by curly brackets and which are indicated in the diagrams of FIGS. 6 to 8 with 1-3 for the cylinders 3 of the first group 3' and with 4-6 for the cylinders 3 of the second group 3". Each cylinder group 3', 3" includes at least one cylinder 3. In the example, each cylinder group 3', 3" includes three cylinders 3, thus a symmetrical distribution of the six cylinders 3 among the two cylinder groups 3', 3". It is principally also possible that more than two cylinder groups are present. It is principally also possible that each cylinder group 3', 3" can comprise more or less than three cylinders 3.

The piston engine 1 has a fresh air system 7 which serves for supplying fresh air to the combustion chambers 4. For this purpose, the fresh air system 7 has a fresh air line 8 which contains a fresh air path 9 which is indicated in FIG. 1 by arrows. Moreover, the piston engine 1 is equipped with an exhaust gas system 10 which serves for discharging exhaust gas from the combustion chambers 4. For this purpose, the exhaust gas system has an exhaust gas line 11 which contains an exhaust gas path 12 which is indicated by arrows. Moreover, the piston engine 1 is equipped with an exhaust gas recirculation system 13 by means of which it is possible to recycle exhaust gas from the exhaust gas system 10 to the fresh air system 7. For this purpose, the exhaust gas recirculation system 13 has at least one recirculation line 14. In the example, two such recirculation lines 14 are provided. Each recirculation line 14 runs from an extraction point or branch-off point 15 to an intake point 16. At the respective branch-off point 15, the respective recirculation line 14 is connected on the inlet side with the exhaust gas line 11. At the respective intake point 16, the respective recirculation line 14 is connected with the fresh air line 8.

In the example, the fresh air system 7 is configured at least in one section which is arranged adjacent to the combustion chambers 4 to have two tracts so that in this region, the fresh air line 8 has a first tract 8' for supplying to the first three combustion chambers 4 and a second tract 8" which serves for supplying to the second three combustion chambers 4. Here, the first fresh air tract 8' serves for supplying fresh air to the cylinders 3 of the first cylinder group 3', while the second fresh air tract 8' is provided for supplying fresh air to the cylinders 3 of the second cylinder group 3". Analog to this, also the exhaust gas system 10 is configured at least in one section, which is arranged adjacent to the combustion chambers 4, to have two tracts so that at least in a section arranged adjacent to the combustion chambers 4, the exhaust gas line 11 has a first tract 11' which is allocated to the cylinders 3 of the first cylinder group 3" and a second tract 11" which is allocated to the cylinders 3 of the second cylinder group 3". Accordingly, each of the two exhaust gas recirculation lines 14 is allocated to one of these tracts 8', 8" or 11', 11", respectively. In the example, each recirculation line 14 includes one exhaust gas recirculation cooler 17.

Further, in the illustrated example, the piston engine 1 is charged so that at least one charging device is provided. In the example, two charging devices are provided, namely a first charging device 18 and a second charging device 19. Both charging devices 18, 19 are configured in the example as exhaust gas turbocharger. Accordingly, the first charging device 18 comprises a first compressor 20 which is arranged in the fresh gas line 8 and which is drivingly connected by means of a first drive shaft 21 with a first turbine 22 which is arranged in the exhaust gas line 11. Accordingly, the second charging device 19 comprises a second compressor 23 which is arranged in the fresh air line 8 and which is drivingly connected by means of a second drive shaft 24 with a second turbine 25 which is arranged in the exhaust gas line 11. For this, the second compressor 23 is arranged downstream of the first compressor 20, while the second turbine 23 is arranged upstream of the first turbine 22. Between the first compressor 20 and the second compressor 23, a first charge air cooler 26 can be arranged in the fresh air line 8. Between the second compressor 23 and the combustion chambers 4, a second charge air cooler 27 can be arranged in the fresh air line 8.

Moreover, the piston engine 1 is equipped with at least one additional valve 28. In the example of FIG. 1, two such additional valves 28 are provided, namely a first additional valve 28' and a second additional valve 28". The respective additional valve 28 is arranged in the fresh air system 7 upstream of the intake valves 5. In the example, in each of the two tracts 8', 8", one such additional valve 28 is arranged. The first additional valve 28' is arranged in the fresh air tract 8', while the second additional valve 28" is arranged in the second fresh air tract 8". Thereby, each additional valve 28 is allocated to three combustion chambers 4.

In order to be able to increase the acceleration power of the piston engine 1, the exhaust gas recirculation system 13 according to FIG. 1 can be equipped with at least one blocking valve 51, by means of which a recirculation path 52 conveyed in the respective recirculation line 14 can be blocked, which recirculation path is indicated by arrows. Since no pressure equalization takes place through the exhaust gas recirculation, more air is available.

At least one of the turbines 22, 25 can be configured in a variable manner according to FIG. 1. For this, turbines with wastegates 54 or with a variable turbine geometry 53 can be used. In the example, only the second turbine 25 is equipped with such a variable turbine geometry 53. The variable turbine geometry 53 allows a change of the inflow cross-section of the respective turbine 25. In this manner, on the one hand, the respective turbine 25 can be kept with a reduced exhaust gas mass flow at an increased speed so as to reduce, in case of a load demand, the so-called turbo hole, thus the response time of the exhaust gas turbocharger 19. On the other hand, by means of the variable turbine geometry 53, the dynamic pressure in the exhaust gas upstream of the respective turbine 25 can be increased, whereby the pressure gradient between the branch-off point 15 and the intake point 16 can be increased for the effectiveness of the exhaust gas recirculation system 13. However, hereby, the exhaust gas back pressure, against which the piston engine 1 works, increases. Consequently, the fuel consumption increases at the same engine load.

In operating points with reduced load and/or with reduced speed, the variable turbine geometry 53 can be actuated for adjusting a comparatively large inflow cross-section. Consequently, the exhaust gas back pressure decreases. A reduction of the exhaust gas recirculation rate, which typically occurs at the same time, can be compensated by a suitable phase position of the respective additional valve according to FIG. 5. Consequently, in the respective operating point, a sufficiently high exhaust gas recirculation rate can be implemented even without back pressure increase by means of the variable turbine geometry 53. Thus, the fuel consumption of the internal combustion engine 1 can be reduced.

For turbines with wastegate 54, analog relationships apply since the exhaust gas back pressure influenced by the wastegate 54 controls or influences the exhaust gas recirculation rate. In FIG. 1, the first turbine 22 is exemplary equipped with a wastegate 54 for controlling a bypass 55 which bypasses the turbine 22 at least partially. By closing the wastegate 54, the exhaust gas pressure increases and the exhaust gas recirculation rate increases.

In a charged internal combustion engine 1, which comprises at least one turbine 22 in the exhaust gas system 10, which turbine is equipped with a wastegate 54 for controlling a bypass 55 which bypasses the turbine 22 at least partially, the respective wastegate 54 can be actuated in operating points with reduced load and/or speed in such a manner that a relatively large flow cross-section for the bypass 55 is obtained, whereas the at least one additional valve 28 is actuated in such a manner that the desired exhaust gas recirculation rate is obtained.

One of the turbines 22, 25, here, the second turbine 25 arranged upstream, can be configured as a twin turbine 47 in another embodiment and can comprise a first inlet 48 and a second inlet 49. The first exhaust gas tract 11' is connected to the first inlet 48 while the second exhaust gas tract 11" is connected to the second inlet 49. Thus, the first cylinder group 3' is ultimately allocated to a non-shown sub-turbine of the twin turbine 47 while the second cylinder group 3" is allocated to a non-shown second sub-turbine of the twin turbine 47.

Figure 2:
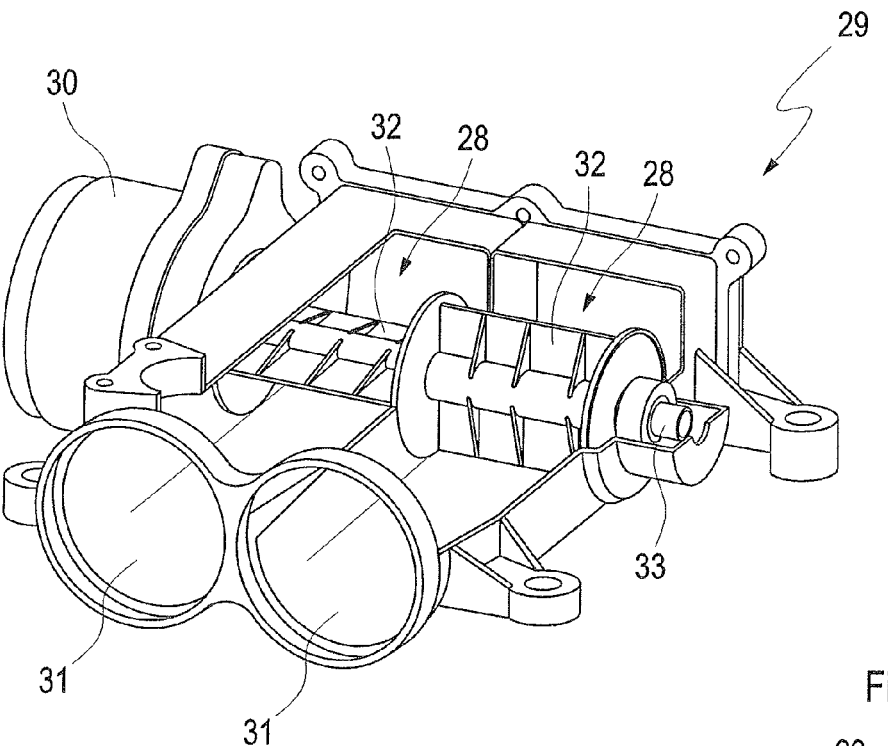
FIG. 2 shows schematically a greatly simplified partial section in a perspective view of an arrangement of two additional valves.

FIG. 2 shows an example for an additional valve device 29 which has two valves 28 which can be activated by a common drive 30. As is apparent, the additional valve device 29 comprises two line sections 31 which are separated from one another in a gas-tight manner and by means of which the additional valve device 29 can be integrated in the two tracts 8', 8" of the fresh gas system 7. In the respective allocated channel section 31, the respective additional valve 28 includes a valve member 32 which, in the example, is formed by a flap gate and which, in particular, can also be designated as butterfly valve. The valve members 32 are arranged in a rotationally fixed manner on a common shaft 33 which is drivingly connected with the drive 30. The drive 30 is preferably configured to rotate the valve members 32. The speed of the drive 30 or the valve members 32 in a 4-cylinder engine 1 with two fresh air tracts 8', 8" corresponds preferably to exactly half the speed of a crankshaft 34 of the piston engine 1 indicated in FIG. 1. In a 6-cylinder engine 1 with two fresh air tracts 8', 8", a flap gate speed is preferred which corresponds to ⅔ of the crankshaft speed. In an 8-cylinder engine 1 with two fresh gas tracts 8', 8", the flap gate speed is preferably equal to the crankshaft speed. Preferably, the additional valve device 29 can comprise two separate drives 30 for the two valve members 32 so that the same can be operated independently from one another.

Figure 3:
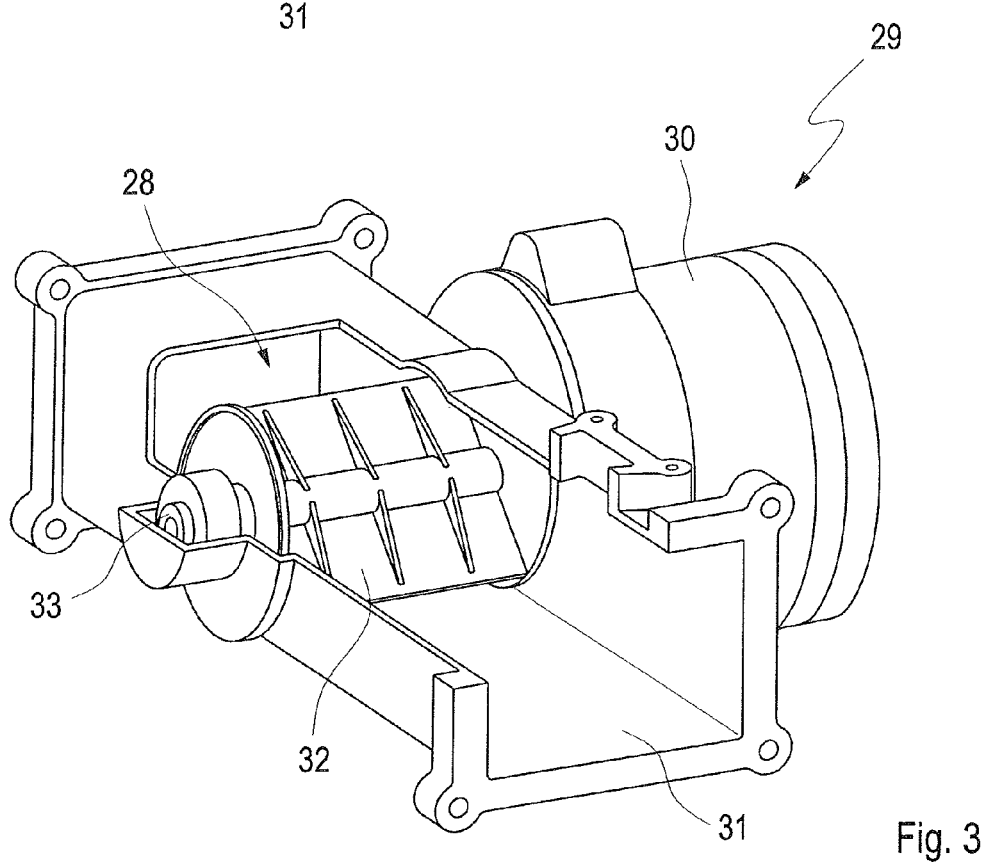
FIG. 3 shows schematically a view as in FIG. 2, but of a single additional valve.

FIG. 3 shows another embodiment of such an additional valve device 29 which, in contrast to the embodiment shown in FIG. 2, has only one single additional valve 28. Accordingly, this embodiment comprises only one channel section 31 and one valve member 32 which is arranged in the channel section 31 and which is drivingly connected with the drive via shaft 33. Preferably, two such additional valve devices 29 are available which can be actuated independently from one another.

The embodiments shown in FIGS. 2 and 3 illustrate examples for suitable additional valves 28 which, when actuated, can alternately open and close the fresh air path 9. For example, the respective valve member 32 rotates during the operation of the piston engine 1, wherein with each full rotation, it passes a closed position twice, whereas it is open between two consecutive closed positions. The time interval between two consecutive closed positions or closing phases defines a switching frequency of the respective additional valve 28. Advantageously, the respective additional valve 28 is actuated synchronously to the crankshaft 34 so that at least during a stationary actuation of the respective additional valve 28, a constant correlation between the speed of the crankshaft 34 and the switching frequency of the respective additional valve 28 exists. For example, the valve member 32 rotates with half or with ⅔ or with the same or with double or with triple of the speed of the crankshaft 34.

The above mentioned correlation between crankshaft 34 and additional valve 28 is illustrated in more detail with reference to the diagram of FIG. 4. In this diagram, the abscissa shows the crankshaft angle in degrees, in short ° KWW. The ordinate shows the lift of the gas exchange valves 5, 6. Entered in the diagram is an exhaust valve lifting curve 35 and an intake valve lifting curve 36. Both lifting curves 35, 36 overlap in a small area. The associated intersection point is arranged specifically at 0° KWW and corresponds also to the upper dead center of a piston movement of the piston allocated to the viewed combustion chamber 4.

Figure 4:
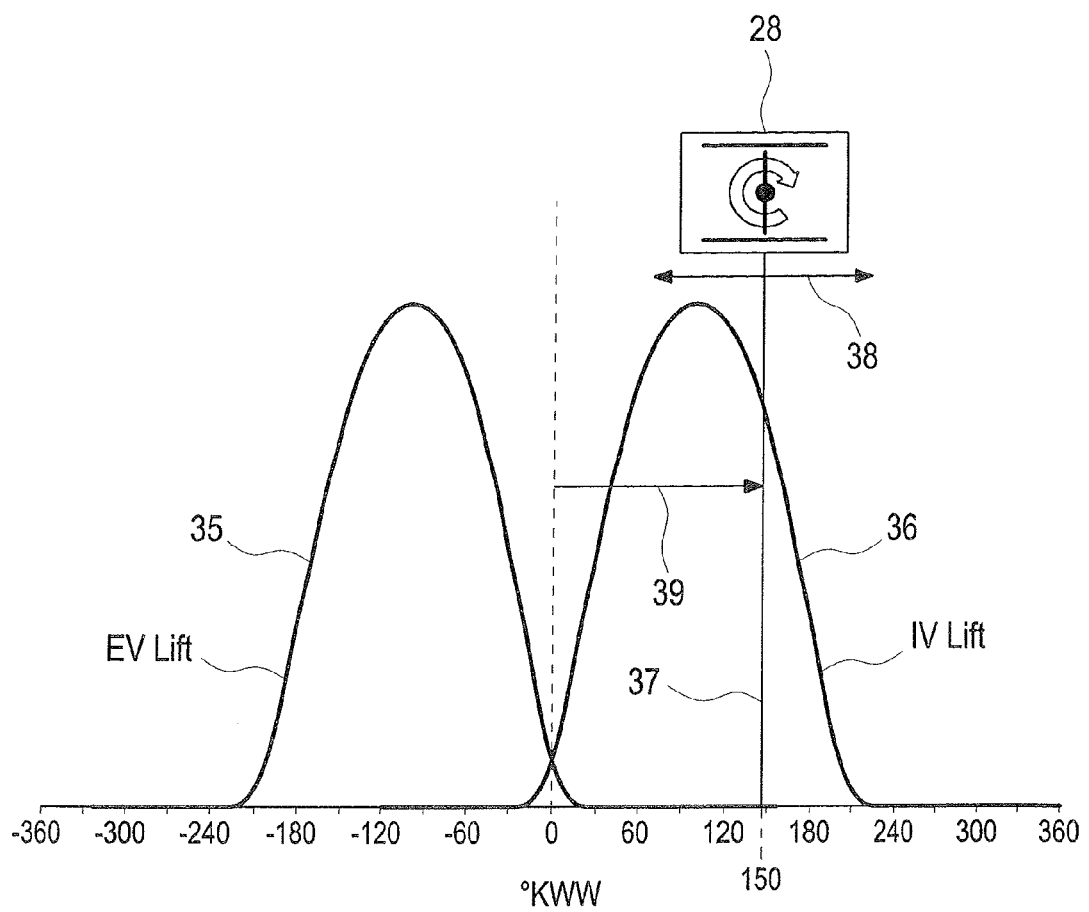
FIG. 4 shows schematically a greatly simplified diagram for illustrating a phase shift between an additional valve and a crankshaft.

Further, the diagram of FIG. 4 includes, in the form of a vertical line, a closing time 37 of the additional valve 28 allocated to the viewed combustion chamber 4, which additional valve is shown symbolically in FIG. 4 for illustration purposes. During a stationary activation of the additional valve 28, said closing time 37 is always in the same relation to the crankshaft 34, thus, is stationary always at the same crankshaft angle. In the example, the closing time 37 is at approximately 150° KWW. The relative position of the closing time 37 relative to the crankshaft angle of the crankshaft 34 defines a phase position between the additional valve 28 and the crankshaft 34. Said phase position is adjustable according to a double arrow 38. The closing time 37 is adjustable toward small crankshaft angles as well as toward large crankshaft angles so as to change the phase position between the additional valve 28 and the crankshaft 34. An arrow 39 indicates that the closing time 37 can be shifted, for example from an initial phase position, at which the closing time 37 lies at 0° KWW and thus runs congruent with the ordinate, to the shown position at which the closing time lies at approximately 150° KWW. It is clear that, principally, larger crankshaft angles for the closing 37 are also possible, e.g., an adjustability up to 240° KWW or larger can be provided, e.g., to be able to implement the closing process within the intake valve lift or shortly (approximately 20°) before or shortly after (approximately 20°) the intake valve lift.

Figure 5:
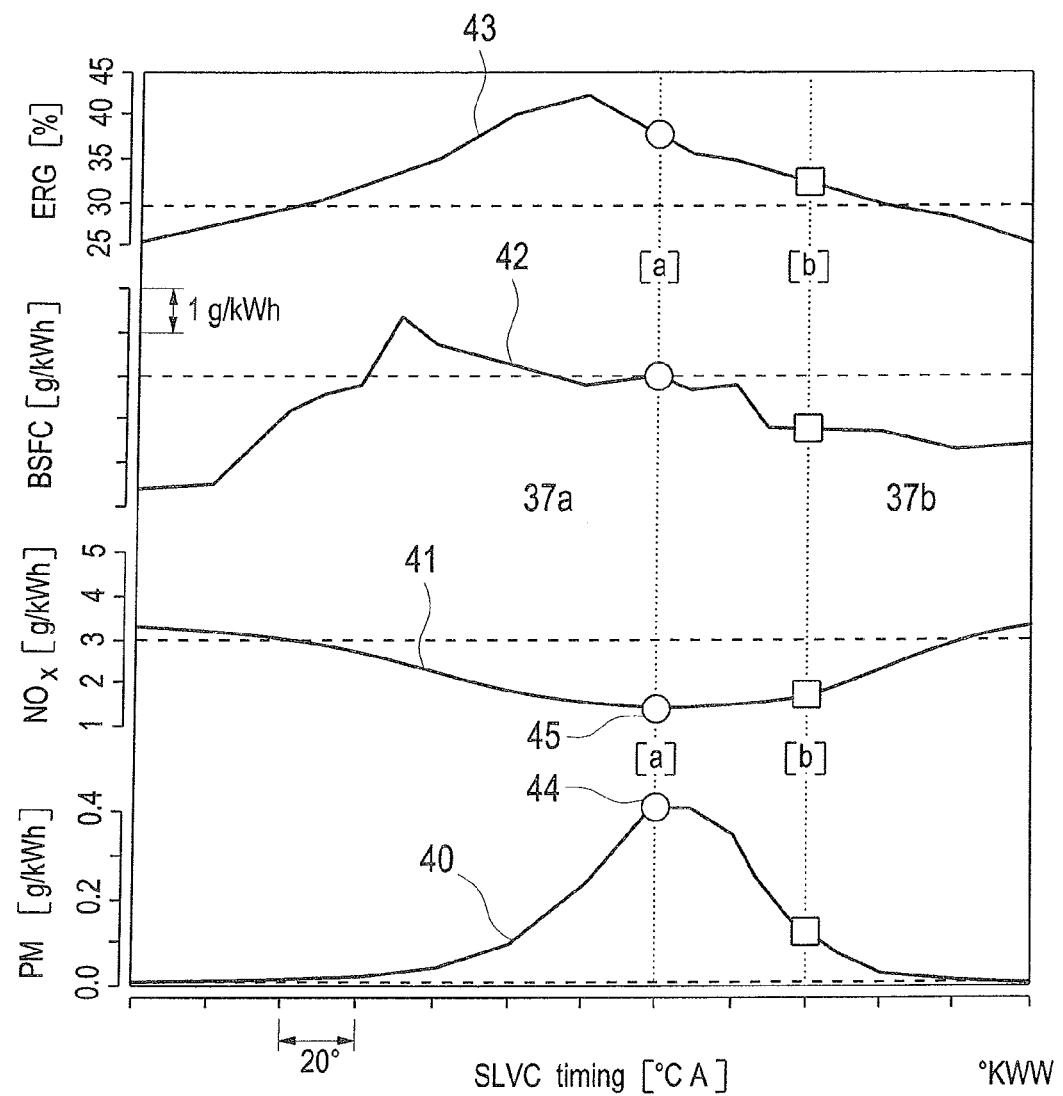
FIG. 5 shows schematically a greatly simplified diagram for illustrating a relation between a phase shift of the additional valve and a plurality of parameters of the piston engine.

In the diagram of FIG. 5, the phase position for the closing time 37 is plotted on the abscissa in ° KWW or in CA°. The ordinate includes, on top of each other, the values for a particle content (PM) of the exhaust gases, the values for a nitrogen oxide content (NOx) of the exhaust gases, the values for a fuel consumption (BSFC) of the piston engine 1, and the values for an exhaust gas recirculation rate (EGR). Accordingly, the diagram of FIG. 5 includes a curve 40 which illustrates the dependency of the particle content in the exhaust gas on the phase position of the additional valve 28, a curve 41 which illustrates the dependency of the nitrogen oxide content on the phase position of the additional valve 28, a curve 42 which illustrates the dependency of the fuel consumption on the phase position of the additional valve 28, and a curve which illustrates the dependency of the exhaust gas recirculation rate on the phase position of the additional valve 28. These relations apply in a stationary operating point of the piston engine 1 which is defined by a constant load and a constant speed.

It is apparent that the individual curves 40 to 43 are completely different and have sometimes an opposing course. A first phase position a and a second phase position b for the closing time 37 are plotted as an example in the diagram of FIG. 5. The respective closing time is designated accordingly as 37a or 37b, respectively. At the first closing time 37a, the particle content according to curve 40 has a maximum 44, whereas the nitrogen oxide content according to curve 41 has a minimum 45 there. At the same time, virtually no change occurs according to curve 42 for the fuel consumption in comparison to a basis plotted with a broken line, whereas the exhaust gas recirculation rate according to curve 43 shows a comparatively high value. Such a phase position can be of advantage for a full load operation or for high speeds with minimal nitrogen oxide emissions if due to the high exhaust gas temperatures, a sufficient regeneration of a particle filter, which absorbs the increasingly occurring soot particles, can be permanently implemented.

The second phase position b corresponding to the second closing time 37b symbolizes an optimized compromise for the particle content, the nitrogen oxide, and the fuel consumption. Since the mentioned parameters have a significant importance for the environment, they are designated hereinafter as environmental parameters. It is clear that besides the three mentioned environmental parameters, further environmental parameters can also be influenced by means of the phase position of the additional valve 28.

Principally, the piston engine 1 can be operated by means of a control device 46, illustrated in a simplified manner in FIG. 1, in such a manner that a desired exhaust gas recirculation rate is adjusted in that by means of the control device 46, the respective additional valve 28 is actuated accordingly. The relation illustrated in FIG. 5 shows that for adjusting the desired exhaust gas recirculation rate according to curve 43, only the associated phase position for the additional valve 28 has to be adjusted. The target figure for this control or adjustment is the exhaust gas recirculation rate. This can be suitable for certain operating states or operating points of the piston engine 1. However, the piston engine 1 or operating method introduced herein takes a different approach. Here, the target figure for the actuation of the respective additional valve 28 is not the exhaust gas recirculation rate, but at least one of the piston engine's 1 environmental parameters mentioned above as an example. For example, it can be provided to adjust the actuation of the respective additional valve 28 or its phase position in the respective operating point in such a manner that a minimum is obtained for the nitrogen oxide content. This corresponds to the first phase position a in FIG. 5. It can also be desired to keep the particle content in the exhaust gas below a predetermined limit value. In this case, according to FIG. 5, a different phase position for the respective additional valve 28 is to be set. It can also be desired to implement a certain reduction for the fuel consumption which in turn, according to FIG. 5, requires a different timing for the closing time 37 of the respective additional valve 28, thus, a different phase position. However, preferred is an embodiment in which for the respective actual operating point, the actuation or the phase position of the respective additional valve 28 is adjusted in such a manner that for at least two of the environmental parameters, an optimal compromise is obtained. Such a compromise setting is indicated by the second phase position b in FIG. 5. The associated exhaust gas recirculation rate then arises automatically.

Such a shift of the phase position of the respective additional valve 28 can be implemented, for example, in that the associated drive 30 is operated for a short time with increased or reduced speed to implement a corresponding advancement or retardation for the phase position of the valve member 32 relative to the crankshaft 34. Also, superordinate phase adjusters can be provided which can change the angle position between rotary drive 30 and drive shaft 32 so as to vary the phase position in this manner. During the change of the phase position, the respective additional valve works unsteady. The adaptation of the phase position can be carried out dynamically, thus during the operation of the piston engine 1. In the course of this, the adaptation of the phase position can be carried out very fast, thus within a very short time. For example, a phase change can be carried out within a time which is shorter than 360° KWW, thus lies within a full rotation of the crankshaft 34. Also conceivable is, e.g., an embodiment in which a common drive 30 is allocated to the two valve members 32, but two separate phase adjusters are allocated by means of which the phase position of the individual valve members 32 or the respective additional valve 28 can be adjusted independently from one another.

FIG. 6 shows in a diagram an exemplary relation between nitrogen oxide content $NO_x$ or fuel consumption be or particle content PM (each on the abscissa) and the load (on the ordinate) during a stationary operation of the piston engine 1 at a constant speed n. Such a relation can occur in certain operating ranges (load states, speed). Here, a curve 50 is shown which represents said relations. Based on this diagram, the operating method which is introduced here and which is in particular carried out with the control device 46, is illustrated hereinafter in more detail.

The piston engine 1 is to be operated with a target load 56 which lies below a full load 57. In the diagram of FIG. 6, the target load 56 is thus to the left of full load 57, hence toward the smaller load values. At constant speed, the load corresponds substantially to the torque which can be detected at the crankshaft 34. In a conventional approach, all cylinders 3 of the piston engine 1 are symmetrically operated with the corresponding portions of said target load 56. As curve 50 shows, at least at certain operating points in the target load 56, a comparatively high value for at least one of the environmental parameters nitrogen oxide content, fuel consumption, and particle content can occur.

In the operating method introduced herein, the cylinders 3 of the first cylinder group 3', thus, e.g., the cylinders 1-3 are operated with a load 58 which is reduced with respect to the target load 56. In contrast to that, the cylinders 3 of the second cylinder group 3'', thus, e.g. the cylinders 4-6, are operated with a second load 59 which is increased with respect to the target load 56. The arrows 65 indicate here the asymmetrical distribution of the target load 56 among the first load 58 of the cylinders 3 of the first group 3' and the second load 59 of the cylinders 3 of the second group 3''. According to the curve 50, the two load points 58, 59 of the two cylinder groups 3', 3'' show better values for at least one of the mentioned environmental parameters. Consequently, at least one of these environmental parameters can be improved for the cylinders 3 as a whole. The shift of the loads toward the smaller or higher loads takes place in particular in a symmetrical manner and advantageously such that in total as resulting load, the desired target load 56 is obtained. However, since improved environmental parameters exist within the individual cylinder groups 3', 3'', the proposed distribution of the loads results in an ecologically and/or economically improved operation for the piston engine 1. The first load 58 provides an important portion of the resulting load, whereby the load distribution along the crankshaft 34 is comparatively advantageous. Provided that the reduction of the first load 58 does not offer any further advantage for adjusting beneficial environmental parameters, the control device 46 can switch to another operating method which provides, for example, a deactivation of the cylinders 3 of the first cylinder group 3'. Then, the decisive factor for switching is not the actual load demand, but the adjustability of optimal values for the environmental parameters.

In extreme cases, the second load 59 can be increased up to full load 57.

The shifting of the load points along the curve 50 is advantageously carried out by varying a fuel quantity supplied to the combustion chambers 4. For adjusting the first load 58, for example, the fuel quantity supplied to the cylinders 3 of the first cylinder group 3' can be reduced with respect to an operation of said cylinders 3 with the target load 56. In contrast to that, the second load 59, e.g., can be adjusted in that the cylinders 3 of the second cylinder group 3'' are supplied with a fuel quantity which is increased with respect to an operation of the cylinders 3 with the target load 56. It is quite possible here that the fuel reduction for adjusting the first load 58 is greater than the fuel increase for adjusting the second load 59, whereby in total less fuel is needed to adjust the desired target load 56.

Furthermore, as already explained above, it is possible to implement an optimization in the respective load point 58 or 59 by adjusting the phase position of the additional valves 28. For this, the phase positions of the two additional valves 28', 28'' can be varied independently from one another in such a manner that the optimization of the two operating points 58, 59 can be carried out independently, in particular by means of different phase positions.

FIG. 7 shows in a diagram the relation between the air ratio lambda (ordinate) and the engine load (abscissa). Said relation is illustrated by a curve 60. On this curve 60, the first load 58 and the second load 59, which are allocated to the two cylinder groups 3', 3'', can be found again. In case of a change of the target load toward greater loads it can make sense, according to FIG. 4, to actuate first only the cylinders 3 of the second cylinder group 3'' for the adaptation of the second load 59. This approach makes sense if the change rate with which the target load is to be changed or increased, is below a predetermined limit value. In other words, at lower rates of change of the target load, the desired load change is implemented by shifting the load point 59 exclusively of the cylinders 3 of the second cylinder group 3'', whereas the cylinders 3 of the first cylinder group 3' remain in their advantageous first load point 58. For example, the load change for minor torque adaptations is implemented in that the first cylinder group 3' is still operated with minimal emission values, whereas the second cylinder group 3" is optimized for the increased load demand.

As soon as a stationary operating point has been reached again after completion of the load change, the first load 58 can be updated accordingly while at the same time the second load 59 is adapted. In the example described herein, in which a load increase is carried out, thus, first only the second load 59 is increased disproportionately high to be able to adjust the desired target load by means of the resulting load. As soon as the target load is stationary, the first load 58 is slightly increased while the second load 59 is reduced accordingly until an optimal compromise for the environmental parameters within the individual cylinder groups 3', 3" or over all cylinders 3 is adjusted again.

To be able to optimize the environmental parameters in the individual cylinder groups 3', 3" by means of the two additional valves 28', 28", it can be provided, additionally or alternatively to the adjustment of different phase positions, to operate the two additional valves 28 with different frequencies. In doing so, it is in particular also possible to deactivate one of the additional valves 28 in an open position so that only the respective other additional valve 28 is active and opens and blocks with its frequency the associated fresh air tract 8' or 8".

FIG. 8 illustrates in another diagram a relation between a plurality of environmental parameters. On the ordinate, for example, the particle content PM and the fuel consumption be are plotted, while the abscissa represents the nitrogen oxide content NOx. A curve of the behavior 61 shows that a decreasing nitrogen oxide content is accompanied by an increasing particle content and an increasing fuel consumption. However, in certain operating points, the behavior 61 illustrated herein can develop which allows to reduce the nitrogen oxides as well as the particles and the fuel consumption. A first operating point 62 (phase 1) shows a state which can be implemented by a corresponding first phase position of the first additional valve 28' for the cylinders 3 of the first cylinder group 3'. Said first operating point 62 shows clearly an extremely low nitrogen oxide content in connection with comparatively high values for particle emission and fuel consumption. A second operating point 63 (phase 2) can be adjusted for the cylinders 3 of the second cylinder group 3", which results in a second phase position which differs from the first phase position. Said second operating point shows low values for the particle content and the fuel consumption, while a comparatively high nitrogen oxide content develops. Remarkable is the operating point 64 (sum point) resulting therefrom which, due to the present curve of the behavior 61, lies below the curve of the behavior 61 and thus represents a compromise which, compared to a symmetrical operation of all cylinders 3 with all environmental parameters running exactly along the behavior curve 61, has reduced values for the nitrogen oxide content on the one hand, and for the particle emission and the fuel consumption on the other. Arrows 66 indicate here the adjustment of the optimized compromise for the environmental parameters.

The invention claimed is:

1. A method for operating an engine, comprising:
   adjusting a target load, which lies below a full load;
   operating at least one cylinder in a first cylinder group with a first load, which is reduced with respect to the target load;
   operating at least one cylinder in a second cylinder group with a second load, which is increased with respect to the target load;
   selecting the first and second loads such that a resulting load is the target load; and
   selecting the first and second loads such that at least one environmental parameter value is improved, wherein the environmental parameters include at least one of a fuel consumption, a nitrogen oxide content in the exhaust gas, and a particle content in the exhaust gas.

2. The method according to claim 1, further comprising: adjusting the first load with respect to the target load by reducing a fuel quantity supplied to the cylinders of the first cylinder group; and adjusting the second load with respect to the target load by increasing a fuel quantity supplied to the cylinders of the second cylinder group.

3. The method according to claim 1, wherein a rate of change of the target load is below a predetermined limit value, and wherein only the cylinders of the second cylinder group are actuated for adapting the second load.

4. The method according to claim 3, wherein upon reaching a stationary target load, the first load is updated and the second load is adapted correspondingly.

5. The method according to claim 1, wherein the at least one environmental parameter is changed by arranging at least one valve in a fresh air system, which supplies fresh air to the cylinders upstream of at least one intake valve, and wherein the at least one intake valve controls a gas exchange.

6. The method according to claim 5, further comprising: providing a first additional valve in a first fresh air tract for fresh air supply to the cylinders of the first cylinder group, wherein the first additional valve opens or blocks a cross-section through which a flow can pass in the first fresh air tract; and providing a second additional valve in a second fresh air tract for fresh air supply to the cylinders of the second cylinder group wherein the second additional valve opens or blocks a cross-section through which a flow can pass.

7. The method according to claim 6, wherein the first and second additional valves alternately open and close the associated cross-section with a frequency, which is proportional to a speed of an engine crankshaft to change the at least one environmental parameter, and wherein a phase position of the first and second additional valves is changed with respect to a rotational position of the crankshaft.

8. The method according to claim 5, wherein the first and second additional valves are arranged in the respective fresh air tract upstream of an intake point through which an exhaust gas recirculation system recycles exhaust gas from an exhaust gas system to the fresh air system, and wherein an exhaust gas recirculation rate results from the actuation of the additional valves based on the valves phase position relative to the crankshaft.

9. The method according to claim 5, further comprising: adjusting a closing time of at least one of the first and second additional valves in a range from approximately 20° crankshaft angle before start of intake at the respective cylinder to approximately 20° crankshaft angle after end of intake at the respective cylinder, wherein a value of approximately 0° crankshaft angle corresponds to the top dead center of a piston allocated to the respective cylinder during the gas exchange.

10. The method according to claim 5, wherein two independent additional valves are used with at least one of separate valve drives, a common valve drive and at least one separate phase adjuster.

11. The method according to claim 5, wherein the two additional valves are operated with different frequencies.

12. The method according to claim 2, wherein a target load change rate is below a predetermined limit value, and wherein only the cylinders of the second cylinder group are actuated for adapting the second load.

13. The method according to claim 2, wherein the at least one environmental parameter is changed by arranging at least one valve in a fresh air system, which supplies fresh air to the cylinders upstream of at least one intake valve, and wherein the at least one intake valve controls a gas exchange.

14. The method according to claim 6, wherein the first and second additional valves are arranged in the respective fresh air tract upstream of an intake point through which an exhaust gas recirculation system recycles exhaust gas from an exhaust gas system to the fresh air system, and wherein an exhaust gas recirculation rate results from the actuation of the additional valves based on the valves phase position relative to the crankshaft.

15. The method according to claim 6, further comprising: adjusting a closing time of at least one of the first and second additional valves in a range from approximately 20° crankshaft angle before start of intake at the respective cylinder to approximately 20° crankshaft angle after end of intake at the respective cylinder, wherein a value of approximately 0° crankshaft angle corresponds to the top dead center of a piston allocated to the respective cylinder during the gas exchange.

16. The method according to claim 6, wherein the first and second additional valves are not intake throttle valves.

17. A engine, comprising:
a first cylinder group, which has at least one cylinder;
a second cylinder group which has at least one cylinder; and
a control device which is at least one of configured and programmed to approximately maintain a target load, wherein the first cylinder group includes a first load, which is reduced relative to the target load and the second cylinder group includes a second load, which is reduced relative to the target load.

18. The engine according to claim 17, further comprising: a fresh air system, which supplies fresh air to the cylinders and includes a first fresh air tract allocated to the cylinders of the first cylinder group and a second fresh air tract allocated to the cylinders of the second cylinder group; an exhaust gas recirculation system, which conveys exhaust gas from an exhaust gas system separately to the tracts of the fresh air system; and at least one additional valve is arranged upstream of an intake point of the exhaust gas recirculation system in each of the first and second fresh air tracts.

19. The engine according to claim 17, wherein the control device is at least one of configured and programmed to deactivate at least one cylinder in the first and second cylinder groups.

20. The engine according to claim 17, further comprising an exhaust gas system, which discharges exhaust gas from the cylinders and has at least one exhaust gas tract, which is allocated to the cylinders of at least one of the first cylinder group and the second cylinder group; and
a twin turbine, is provided, which has a first inlet allocated to the first exhaust gas tract and a second inlet allocated to the second exhaust gas tract.

21. The engine according to claim 20, wherein the twin turbine is an exhaust gas turbocharger.

* * * * *